(12) United States Patent
Zimmel (10) Patent No.: US 6,419,402 B1
(45) Date of Patent: Jul. 16, 2002

(54) FIBER OPTIC CONNECTOR AND METHOD FOR ASSEMBLING

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/459,968

(22) Filed: Dec. 13, 1999

(51) Int. Cl.$^7$ ................................................. G02B 6/36
(52) U.S. Cl. ........................................... 385/86; 385/87
(58) Field of Search ............................. 385/69, 72, 77, 385/78, 80, 86, 87

(56) References Cited

U.S. PATENT DOCUMENTS

| | | | |
|---|---|---|---|
| 4,607,911 A | 8/1986 | Rhodes | 350/96.2 |
| 4,679,895 A | 7/1987 | Huber | 350/96.2 |
| 5,096,276 A | 3/1992 | Gerace et al. | 385/76 |
| 5,181,267 A | 1/1993 | Gerace et al. | 385/86 |
| 5,214,732 A | 5/1993 | Beard et al. | 385/78 |
| 5,222,169 A | 6/1993 | Chang et al. | 385/87 |
| 5,317,663 A | 5/1994 | Beard et al. | 385/70 |
| 5,436,994 A * | 7/1995 | Ott et al. | 385/86 |
| 5,461,690 A | 10/1995 | Lampert | 385/100 |
| 5,671,310 A | 9/1997 | Lin et al. | 385/78 |
| 5,682,451 A | 10/1997 | Lee et al. | 385/78 |
| 5,732,175 A * | 3/1998 | Fan | 385/87 |
| 5,768,455 A | 6/1998 | Konik | 385/86 |
| 5,809,192 A | 9/1998 | Manning et al. | 385/78 |
| 5,883,995 A | 3/1999 | Lu | 385/60 |

OTHER PUBLICATIONS

Molex MT–RJ Connector System Datasheet [online]. Fiber Optic Center, Inc., 1998 [retrieved on Jul. 11, 2001] Retrieved from the Internet: <URL: www.focenter.com/template.cfm?location=data.cfm&ProductID=447>.*

Fiber Optic Technical Seminar, *Connectors and Splices*, TR–102(SW), First Edition, Issue 2, ADC Telecommunications, Inc., 10 pages (Mar. 1997).

SUP–1 Series Single–Mode FC/SC Universal Connector Plug Assembly Manual, Document No. 39NCA–68B2–01, Seiko Instruments Inc., 33 pages (1996).

* cited by examiner

*Primary Examiner*—Cassandra Spyrou
*Assistant Examiner*—Alessandro V. Amari
(74) *Attorney, Agent, or Firm*—Merchant & Gould P.C.

(57) ABSTRACT

The present disclosure relates to a fiber optic device including a connector housing including a front housing piece, an intermediate housing piece, and a rear housing piece that is non-unitarily connected to the intermediate housing piece. The rear housing piece and the intermediate housing piece define passages that are in general alignment with one another. The fiber optic device also includes a hub positioned within the connector housing. The hub includes a passage that aligns generally with the passage of the intermediate housing piece. The hub is spring biased toward a front end of the connector housing. The fiber optic device further includes a ferrule connected to the hub, and a fiber optic cable. The ferrule defines a passage that extends in general axial alignment with the passage of the hub. A fiber portion of the fiber optic cable is adhesively bonded within the passage of the ferrule. A buffered portion of the fiber optic cable extends through the passage of the rear housing piece. An outer casing and a reinforcing portion of the fiber optic cable are crimped to the exterior of the rear housing piece.

23 Claims, 10 Drawing Sheets

FIBER OPTIC CONNECTOR AND METHOD FOR ASSEMBLING

FIELD OF THE INVENTION

The present invention relates to fiber optic connectors for use in optical fiber signal transmission systems, and to methods for assembling such fiber optic connectors.

BACKGROUND OF THE INVENTION

Fiber optic cables are used in the telecommunications industry to transmit light signals in high speed data and communication systems. A standard fiber optic cable includes an inner light transmitting fiber surrounded by a coating layer of a polymeric material such as nylon. The coating layer is surrounded by a reinforcing or strength layer (e.g., Kevlar) that is covered by an outer casing or jacket made of a polymeric material such as polyvinyl chloride (PVC).

Fiber optic connectors are frequently used to non-permanently connect and disconnect optical elements in a fiber optic transmission system. There are many different fiber optic connector types. The most prevalent optic connectors are FC and SC connectors. Other common types of connectors include ST and D4-type connectors.

A typical fiber optic connector includes a housing having a front end positioned opposite from a rear end. The front end of the housing is commonly configured to be inserted within an adapter. A fiber optic cable is usually inserted into the connector through a passage (commonly referred to as a capillary) defined by the rear end of the housing. The connector typically includes a ferrule that is mounted adjacent the front end of the housing. The ferrule is axially moveable relative to the housing, and is spring biased toward the front of the connector. The fiber optic cable has an end that is stripped. The stripped end includes a bare fiber that extends through the ferrule, and a buffered portion that extends through the remainder of the connector. Adhesive (e.g., epoxy) is used to secure the fiber within the ferrule. The adhesive is often applied by a needle inserted through the passage defined by the rear end of the housing. A reinforcement layer of the fiber optic cable is frequently crimped to the rear end of the housing.

When a connector such as the connector described above is used to provide a fiber optic connection, the ferrule is typically forced to slide rearwardly within the housing. In concert with the movement of the ferrule, the buffered portion of the cable also slides relative to the housing. It is important for the buffered portion to be capable of sliding relative to the housing because, absent such capability, the fiber may break when the ferrule is moved. Misapplied adhesive within the connector housing has been known to cause the buffered portion to "lock-up" within the housing (i.e., the buffered portion becomes adhesively bonded to the housing) such that the buffered portion is prevented from sliding relative to the housing. Thus, in assembling a fiber optic connector, it is desirable to have safeguards for ensuring that the buffered portion is free to slide relative to the housing. Safeguards are particularly important when assembling connectors for small diameter fiber optic cables because such connectors have small inner diameters creating a situation where adhesive can inadvertently be misapplied to the small inner diameters. This is problematic because when cables are subsequently inserted in the connectors, the misapplied adhesive can cause the buffered portions of the cables to "lock up." It is also desirable for fiber optic connectors to be capable of receiving fiber optic cables having different diameters.

SUMMARY OF THE INVENTION

One aspect of the present invention relates to a fiber optic device including a fiber optic connector and fiber optic cable secured to the connector. The fiber optic connector includes a first housing piece that extends along a longitudinal axis. The first housing piece includes a front end positioned opposite from a rear end. The first housing piece also defines an inner chamber. A hub is positioned within the inner chamber of the first housing piece. The hub includes a passage that extends along the longitudinal axis of the first housing piece. The hub is slidable along the longitudinal axis relative to the first housing piece. A ferrule is connected to the hub. The ferrule extends along the longitudinal axis from the hub toward the front end of the first housing piece. The ferrule defines a passage that extends in general axial alignment with the passage of the hub. A second housing piece is positioned at the rear end of the first housing piece. The second housing piece defines a passage that is in general alignment with the passage of the hub. A spring is captured between the hub and the second housing piece for biasing the hub toward the front end of the first housing piece. The connector further includes a third housing piece that is non-unitarily connected to the second housing piece. The third housing piece defines a passage that is in general axial alignment with the passage of the second housing piece. The third housing piece includes an outer crimp region against which a portion of the fiber optic cable is crimped. The fiber optic cable includes a fiber that extends through: (1) the passage of the ferrule; (2) the passage of the hub; (3) the passage of the second housing piece; and (4) the passage of the third housing piece.

Another aspect of the present invention relates to a method for assembling a fiber optic device. The method includes providing a connector including a housing having a first end positioned opposite from a second end. The connector also includes a ferrule that is spring biased toward the first end of the housing. The ferrule defines a longitudinal ferrule passage. The second end of the housing defines an access opening. Adhesive is provided to the ferrule passage by inserting an adhesive delivering tool through the access opening. After the adhesive has been provided to the passage of the ferrule, an extension piece is connected to the second end of the housing. Also after the adhesive has been provided, a fiber of a fiber optic cable is inserted within the ferrule passage. The method further includes inserting at least a portion of the fiber optic cable through the extension passage and the access opening, and securing at least a portion of the fiber optic cable to an exterior of the extension piece.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Where ever possible, the same reference numbers will be used throughout the drawings to refer to the same or like parts. A similar part in different embodiments will be assigned that same reference number with the addition of an apostrophe differentiate the embodiments.

Figure 1:
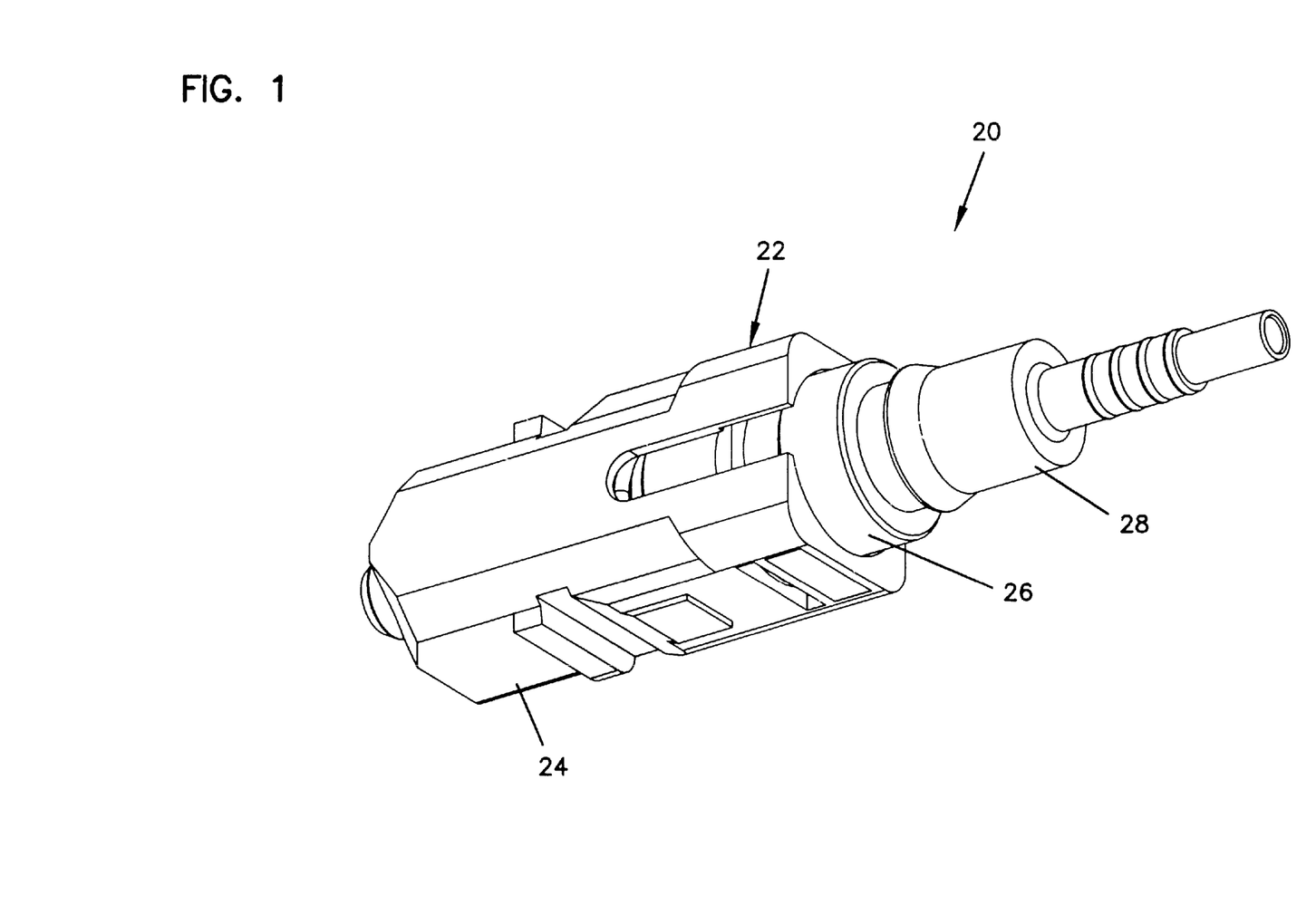
FIG. 1 is a respective view of an SC-type connector constructed in accordance with the principles of the present invention.
Figure 2:
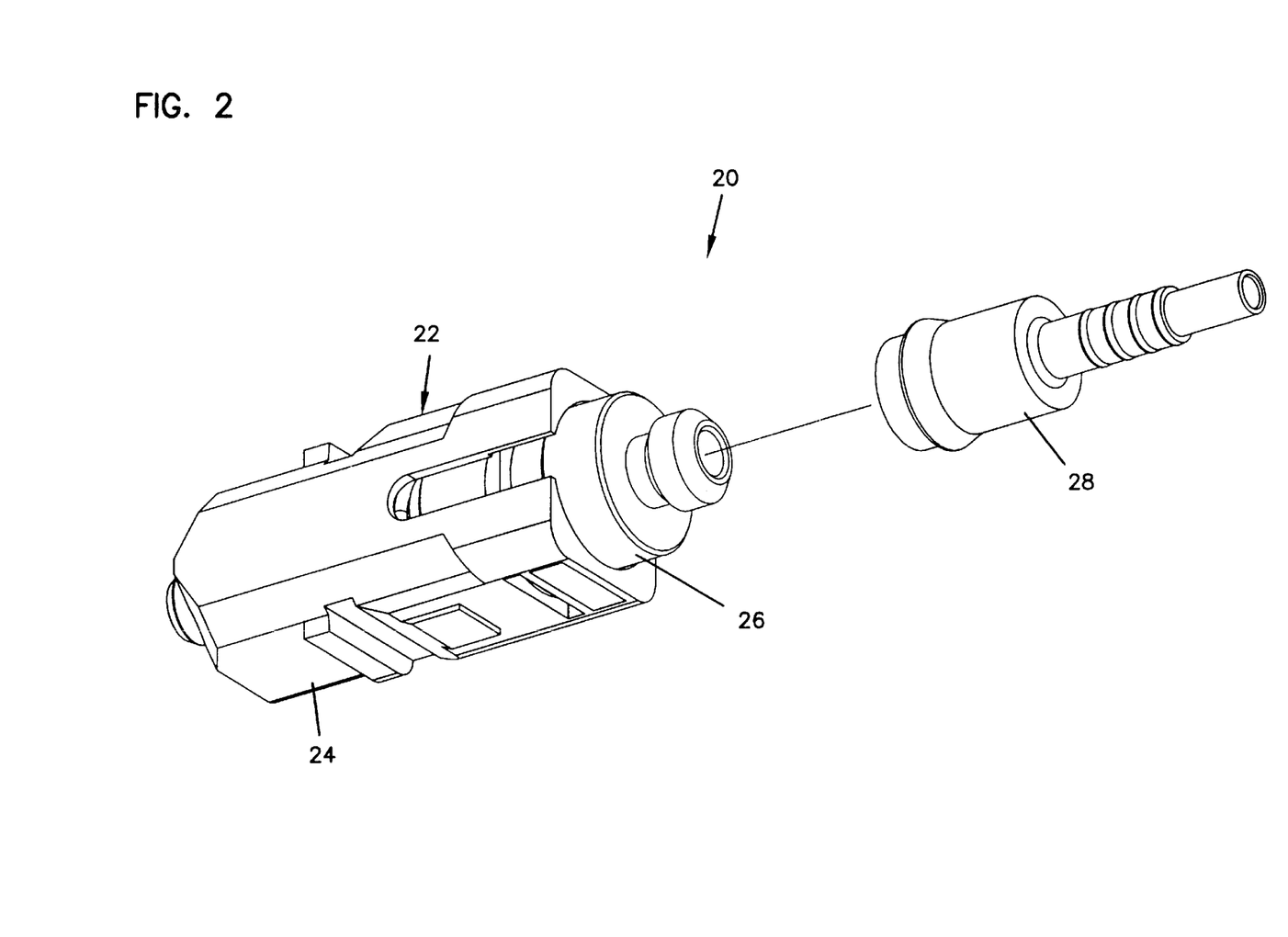
FIG. 2 illustrates the connector of FIG. 1 with a rear extension removed.

FIG. 1 illustrates an SC-type connector 20 constructed in accordance with the principles of the present invention. The connector includes a housing 22 having a front housing piece 24 connected to a rear housing piece 26. A rear extension piece 28 is connected to the rear housing piece 26 by a non-unitary connection. The phrase "non-unitary connection" is intended to mean that the rear housing piece 26 and the rear extension piece 28 are not formed as a single, unitary, seamless piece. For example, FIG. 2 shows the rear extension piece 28 is formed as a separate piece from the rear housing piece 26. Exemplary types of non-unitary connections that can be used between the rear housing piece 26 and the rear extension piece 28 include, among other things, press fit connections, adhesive connections, and threaded connections.

Figure 3:
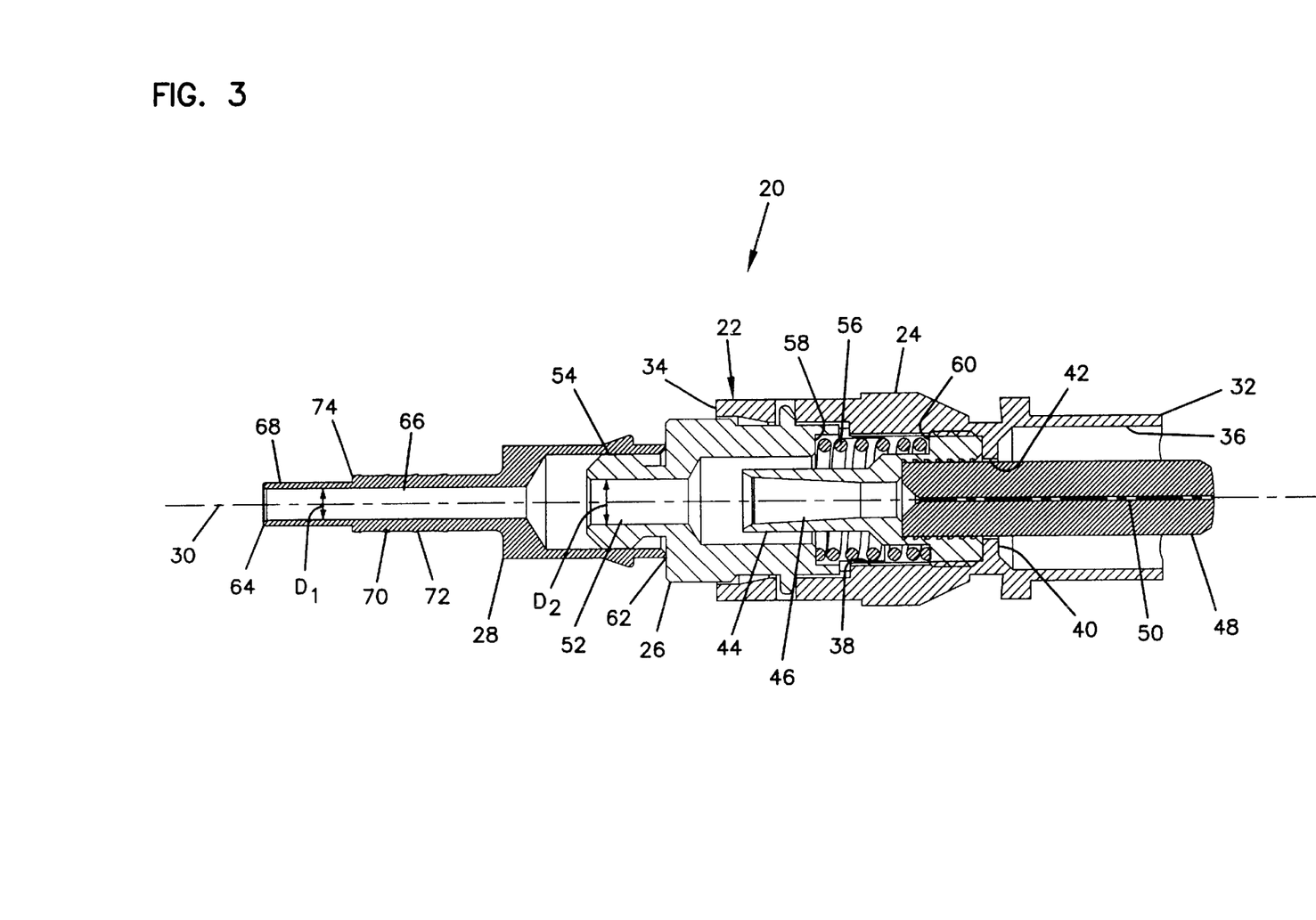
FIG. 3 is a cross-sectional view taken longitudinally through the connector of FIG. 1.

For clarity, no fiber optic cable has been provided in FIG. 3. Also for clarity, a number of other elements conventionally found in SC-type connectors (e.g., a hood or boot mounted at the rear of the connector and a slidable outer grip located at the front of the housing) have not been shown in FIG. 3. However, as will be described later in the specification, such elements are shown mounted on the connector 20 in FIG. 7.

Referring to FIG. 3, the front housing piece 24 of the connector 20 extends along a longitudinal axis 30 and includes a front end 32 positioned opposite from a rear end 34. The front housing piece 24 also defines a front chamber 36 and a rear chamber 38. A transverse wall 40 separates the front and rear chambers 36 and 38. An opening 42 centered about the longitudinal axis 30 is defined by the transverse wall 40. The front and rear ends 32 and 34 of the front housing piece 24 are open.

The connector 20 also includes a hub 44 positioned within the rear chamber 38 of the front housing piece 24. The hub is mounted to slide longitudinally along the axis 30 relative to the front housing piece 24 and includes a longitudinal passage 46 that extends along the longitudinal axis 30.

The primary purpose of the hub 44 is to provide a secure mount for holding a ferrule 48. For example, as shown in FIG. 3, the ferrule 48 has a rear portion mounted within a front recess defined by the hub 44. Preferably, a conventional fastening technique (e.g., an adhesive such as epoxy) is used to secure the ferrule 48 to the hub 44.

The ferrule 48 extends along the longitudinal axis 30 from the hub 44 toward the front end 32 of the front housing piece 24. As shown in FIG. 3, the ferrule 48 extends through the central opening 42 of the transverse wall 40 between the rear and front chambers 38 and 36 of the front housing piece 24. A longitudinal passage 50 extends through the ferrule 48. The passage 50 is coaxially aligned with the longitudinal passage 46 of the hub 44 and is sized to receive a bare fiber of a fiber optic cable.

Referring still to FIG. 3, the rear housing piece 26 of the connector 20 is mounted at the rear end 34 of the front housing piece 24. The rear housing piece 26 defines an access passage 52 that is coaxially aligned with the passage 46 of the hub 44 and the passage 50 of the ferrule 48. The access passage 52 is defined at least partially by a projection 54 that projects rearwardly outward from a main body of the rear housing piece 26.

The connector 20 further includes a coil spring 56 mounted within the rear chamber 38. The coil spring 56 surrounds a portion of the hub 44 and is captured between a forwardly facing shoulder 58 formed by the rear housing piece 26 and a rearwardly facing shoulder 60 formed by the hub 44. The spring 56 functions to bias the hub toward the front end 32 of the front housing piece 24. Because the ferrule 48 is connected to the hub 44, the spring 56 also functions to bias the ferrule 48 in a forward direction.

The rear extension piece 28 of the connector has a front end 62 positioned opposite from a rear end 64. The front end 62 is mounted over the rear projection 54 of the rear housing piece 26. An extension passage 66 extends longitudinally through the rear extension piece 28. The extension passage 66 is coaxially aligned with the hub passage 46, the ferrule passage 50 and the access passage 52. Adjacent the front end 62 of the rear extension piece 28, the diameter of the extension passage 66 increases such that the rear projection 54 of the rear housing piece 26 can be received within the extension passage 66.

The rear end 64 of the rear extension piece 28 is adapted for connection to a fiber optic cable. For example, directly at the rear end 64 is a reduced outer diameter portion 68 configured for allowing an outer jacket 84 and reinforcing layer 82 of a fiber optic cable 76 (shown in FIG. 6) to be placed over the rear extension piece 28. The rear end 64 also includes a crimping region 70. The crimping region 70 is positioned adjacent to the reduced outer diameter portion 68 and includes an exterior surface defining a plurality of radial ribs or projections 72. Alternatively, any surface conducive for securing a crimp (e.g., a knurled surface, a roughened surface, a high friction surface, a threaded surface, etc.) could be used. A radial shoulder 74 separates the reduced outer diameter portion 68 from the crimping region 70. When a fiber optic cable is secured to the rear extension piece 28, the reinforcing layer 82 of the cable 78 can be crimped around the outer circumference of the rear extension piece 28 adjacent the crimping region 70.

Still referring to FIG. 3, the extension passage 66 has a diameter $D_1$ that is smaller than a diameter $D_2$ of the access passage 52. Preferably, the diameter $D_2$ of the access passage 52 is at least 25% larger than the diameter $D_1$ of the extension passage 66.

Figure 4:
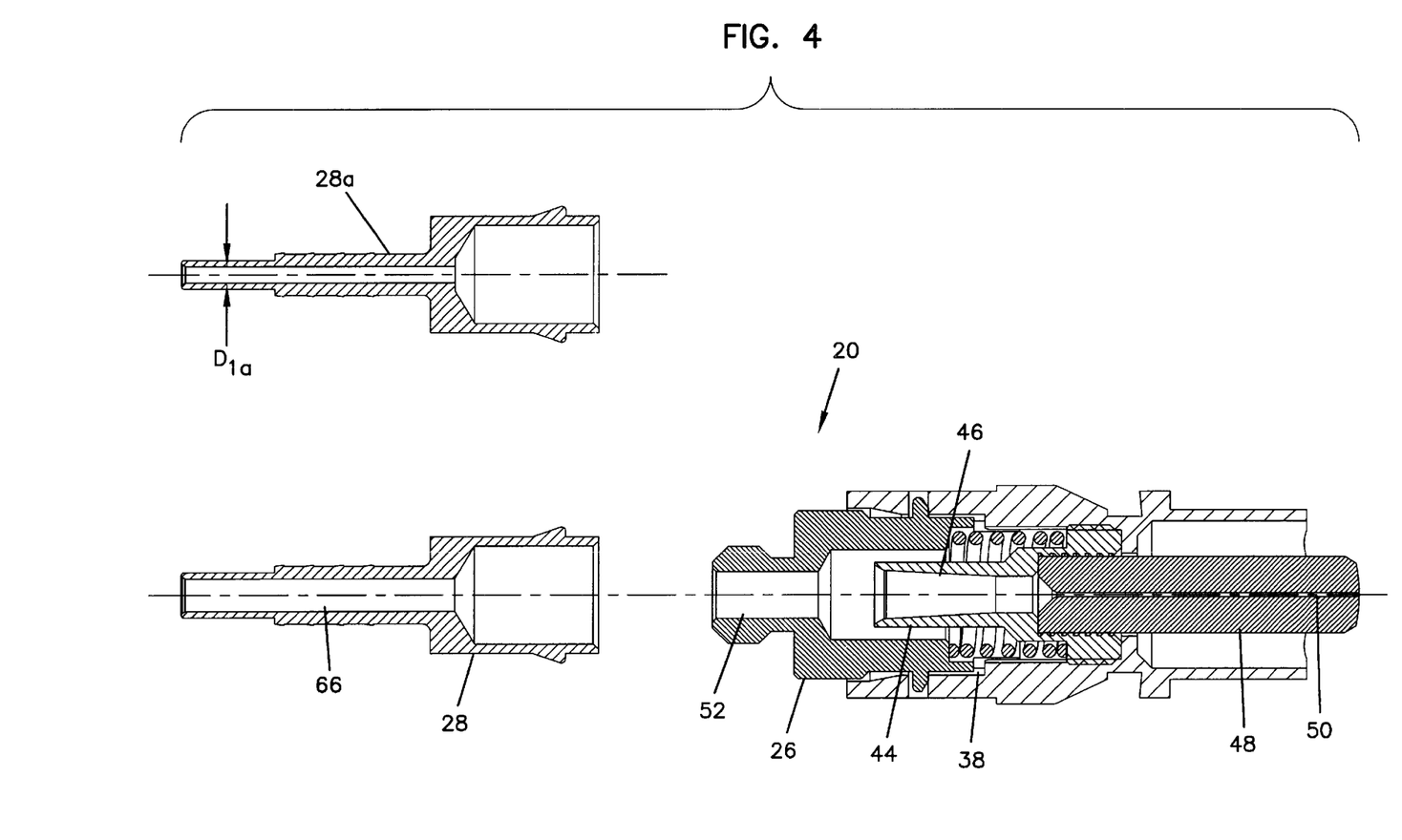
FIG. 4 is a cross-sectional view taken longitudinally through the connector of FIG. 2.
Figure 5:
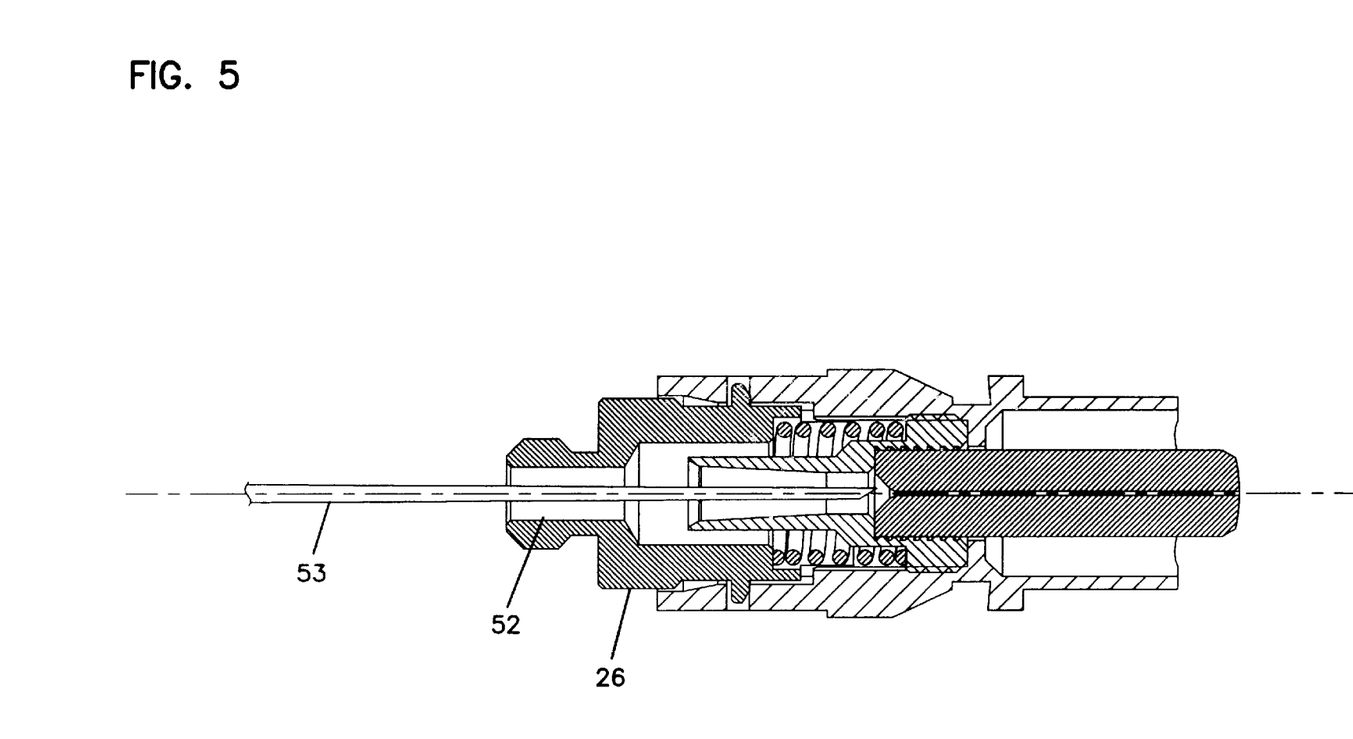
FIG. 5 illustrates adhesive being applied to the connector of FIG. 4.

FIGS. 4–7 illustrate various stages of a method for assembling the connector 20 of FIGS. 1–3. FIG. 4 shows the connector 20 before the rear extension piece 28 has been connected to the rear housing piece 26. With the rear extension piece 28 separate from the rear housing piece 26, the access passage 52 provides ready access to the rear chamber 38 of the front housing piece 24. For example, the relatively large diameter of the access passage 52 along with its close proximity to the hub 44 assist in allowing an adhesive applying tool to be used to fill the ferrule passage 50 of the ferrule 48 with adhesive (e.g., epoxy). For example, as shown in FIG. 5, a needle 53 can easily be inserted through the access passage 52 and used to precisely inject adhesive into the hub passage 46 and the ferrule passage 50. Because the needle 53 is not required to pass through the rear extension piece 28, adhesive is prevented from being inadvertently applied to the interior of the rear extension piece 28.

Figure 6:
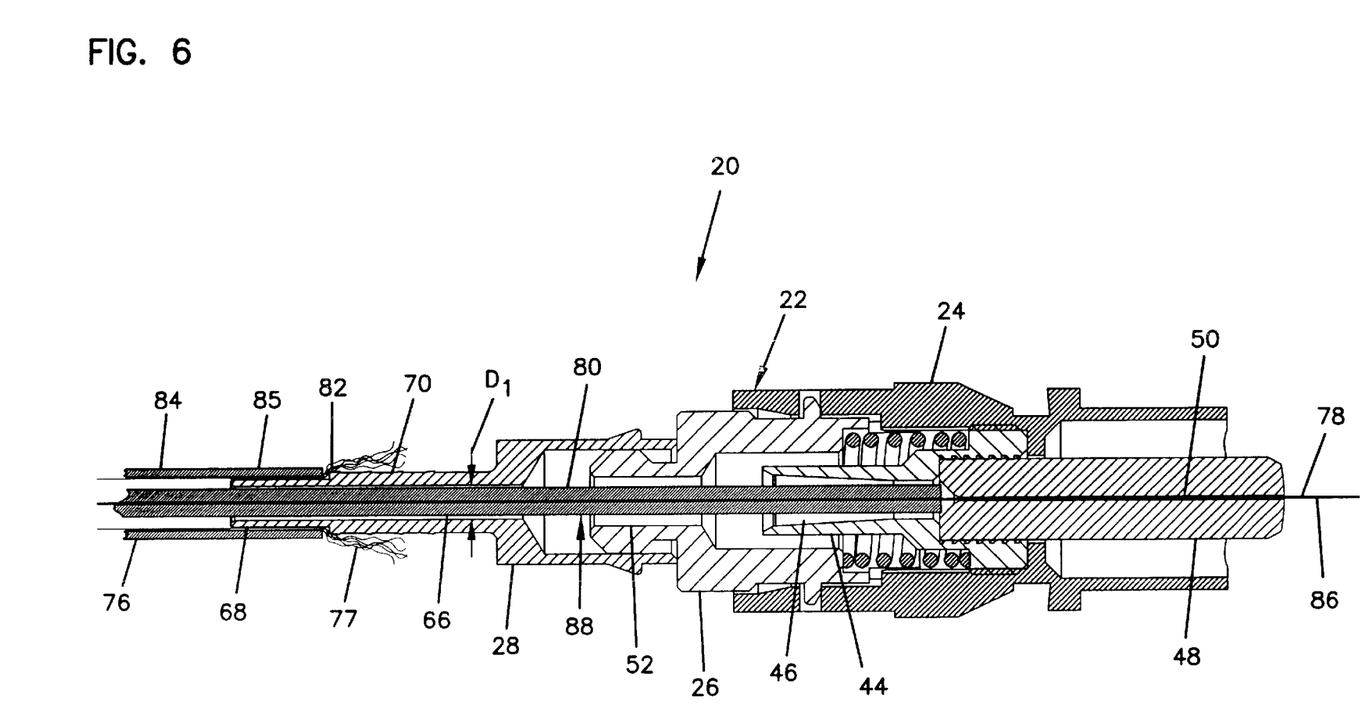
FIG. 6 illustrates the connector of FIG. 5 with a fiber optic cable inserted therein and the rear extension mounted on the housing.

After the adhesive has been injected into the ferrule passage 50, the rear extension piece 28 is connected to the rear housing piece 26, and the fiber optic cable 76 is fed into the connector 20. As shown in FIG. 6, the cable 76 includes a central fiber 78, a polymeric coating 80 (e.g., PVC, nylon, etc.) covering the fiber 78, the reinforcing material 82 (e.g., Kevlar) surrounding the coating 80, and the outer jacket 84 (e.g., a PVC jacket) surrounding the reinforcing material 82. To prepare the cable 76 for insertion into the connector 20, the free end of the cable 76 is stripped to form a bare fiber portion 86. Adjacent the bare fiber portion 86, the fiber optic cable 76 is stripped down to the coating 80 to form a buffered portion 88. Additionally, a portion 77 of the reinforcing material 82 is exposed for use in crimping the fiber optic cable 76 to the connector 20.

To insert the fiber optic cable 76 into the connector 20, the cable 76 is inserted through the coaxially aligned passages 66, 52, 46 and 50. After insertion, the bare fiber portion 86 extends through the passage 50 of the ferrule 48, and the buffered portion 88 extends through the hub passage 46, the access passage 52, and the extension passage 66. An overlap portion 85 of the outer jacket 84 and the reinforcing layer 82 overlap the reduced outer diameter portion 68 of the rear extension piece 28. Also, the exposed portion 77 of reinforcing material 82 overlaps the crimping region 70 of the rear extension piece 28.

Preferably, the diameter $D_1$ of the extension passage 66 is selected to closely surround and support the buffered portion 88 of the fiber optic cable 76. In one particular embodiment, a clearance less than 0.004 inches is provided between the buffered portion 88 and the wall defining the extension passage 66. For example, in one non-limiting embodiment, the buffered portion has an outer diameter of about 0.035 inches and the diameter $D_1$ of the extension passage 66 is about 0.042 inches. The separate rear extension piece 28 allows the front portion of the connector 20 to accommodate fiber optic cables having varying diameters. For example, if a smaller diameter cable is required, a rear extension piece 28a (shown in FIG. 4) having a smaller diameter $D_{1a}$ is selected and used in concert with the front portion of the connector 20. By contrast, if a larger diameter fiber optic cable is required, the rear extension piece 28 having the larger diameter $D_1$ is selected. Therefore, regardless of the size of fiber optic cable selected, a rear extension piece suitable for providing adequate support and guidance to the cable can be selected.

Figure 7:
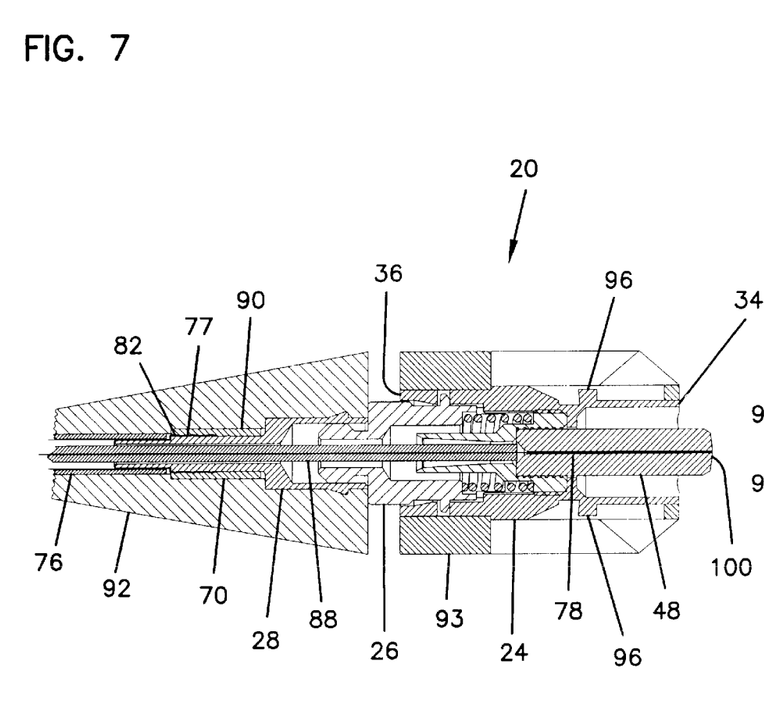
FIG. 7 illustrates the connector of FIG. 6 with the fiber optic cable crimped on the rear extension, with a boot positioned over the rear extension, and with a conventional grip mounted at the front of the connector.

FIG. 7 shows the connector 20 as fully assembled. As shown in FIG. 7, the exposed portion 77 of the reinforcing material 82 is secured to the crimping region 70 by a circumferential crimping tube 90. Also, a boot 92 (i.e., a hood) is shown attached to the rear extension piece 28. Further, a conventional grip 93 is shown snap fit over the front housing piece 24.

Still referring to FIG. 7, the connector 20 is shown in alignment with a conventional adapter 94. When the front end 32 of the front housing piece 24 is inserted within the adapter 94, transverse projections 96 formed on the front housing piece 24 move past resilient tabs 98 within the adapter 94 to provide a snap fit connection. To remove the connector 20 from the adapter 94, the grip 93 is pulled rearwardly causing the tabs 98 to deflect outward such that the connector can be pulled from the adapter 94.

When the connector 20 is inserted in the adapter 94, a polished end face 100 of the ferrule 48 of the connector 20 is pressed against a corresponding ferrule end face of an opposing connector (not shown) mounted in the adapter 94. As the ferrule 48 engages the ferrule of the opposing connector (not shown), the ferrule 48 slides rearwardly within the front housing piece 24. When the ferrule 48 slides in a rearward direction relative to the front housing piece 24, the buffered portion 88 of the fiber optic cable 76 also slides relative to the housing 22. The relative sliding motion between the buffered portion 88 and the housing 22 is important to reduce the risk of breaking or otherwise damaging the fiber 78. In this regard, the manufacturing method described above is advantageous because, since the needle 53 (shown in FIG. 5) is not required to be inserted through the rear extension piece 28, adhesive is inhibited from being inadvertently applied to the interior of the rear extension piece 28.

It will be appreciated that the aspects of the present invention are particularly applicable to fiber optic connectors for use with small diameter fiber optic cables (i.e., fiber optic cables having a outer jacket diameters less than 2 millimeters). One particular non-limiting application relates to connectors for fibers having outer jacket diameters of about 1.7 millimeters.

To accommodate a small diameter fiber optic cable, it is desirable for the outer diameter of the rear extension 28 (e.g., at the crimping region 70) to be relatively small (e.g., less than 2 millimeters). This is desirable because small cables have relatively little reinforcing material (e.g., Kevlar) due to their small diameters. To equally distribute tensile load relief, the reinforcing material should be evenly distributed about the crimp region. If the reinforcing material is not evenly distributed, the fiber of the cable may break when a tensile load is applied to the cable. The use of a small outer diameter at the crimp region 70 facilitates uniformly distributing the reinforcing material.

Since the outer diameter of the rear extension is preferably relatively small, the extension passage 66 of the connector also has a relatively small diameter. If the rear extension 28 were formed as a single piece with the rear housing piece 26, adhesive would need to be applied to the ferrule passage 50 by inserting the needle 53 through the extension passage 66. Since the diameter of the extension passage 66 is small, at least some adhesive would likely be coated within the extension passage 66 when the needle 53 is withdrawn. In view of the small clearance between the buffered portion 88 and the extension passage 66, any adhesive present in the extension passage 66 could cause the buffered portion 88 to bind or otherwise lock up relative to the housing 22 thereby increasing the likelihood of fiber breakage. The various aspects of the present invention eliminate this problem by making the rear extension 28 a separate piece.

Figure 8:
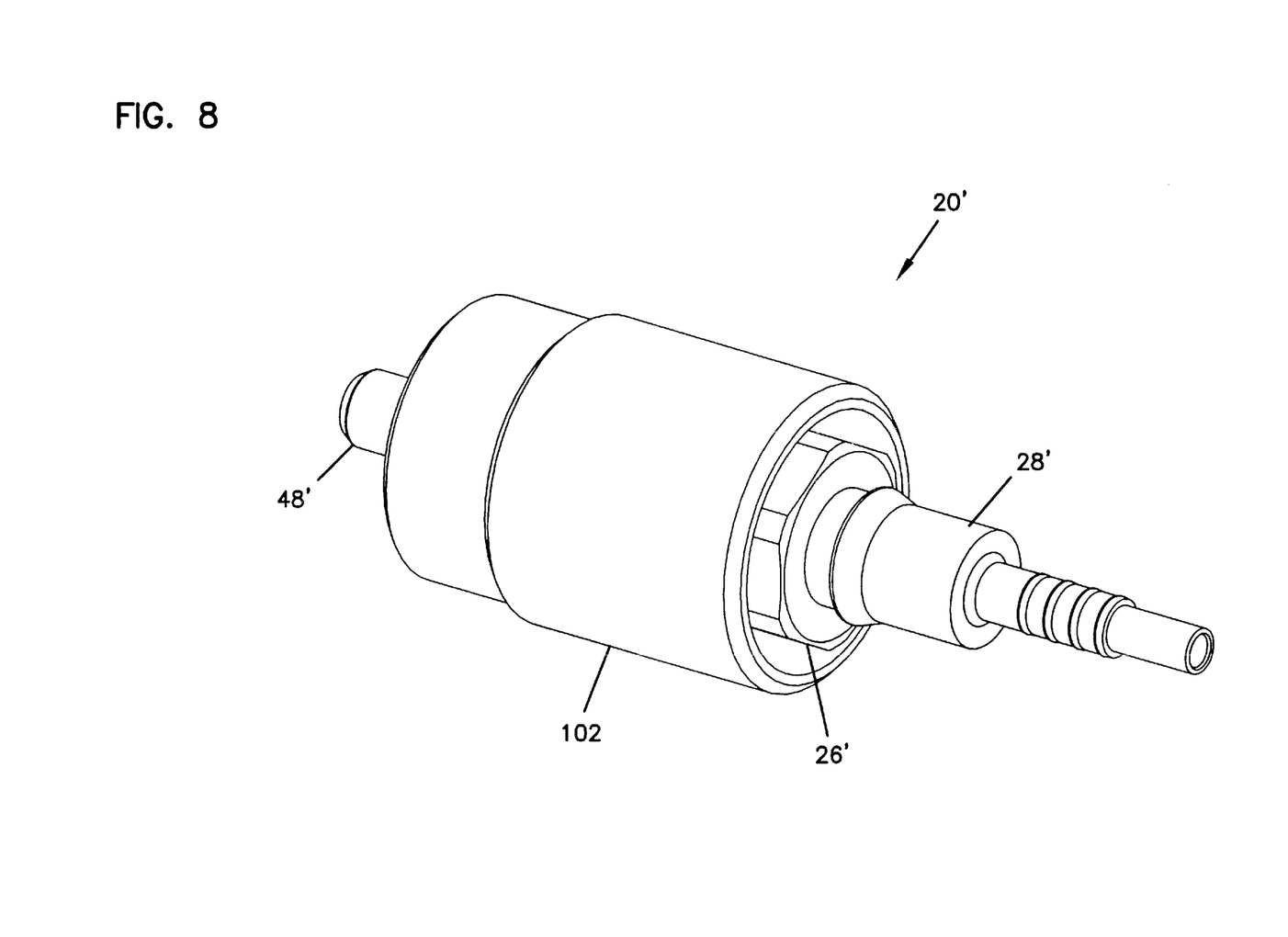
FIG. 8 illustrates a perspective view of another connector constructed in accordance with the principles of the present invention.
Figure 9:
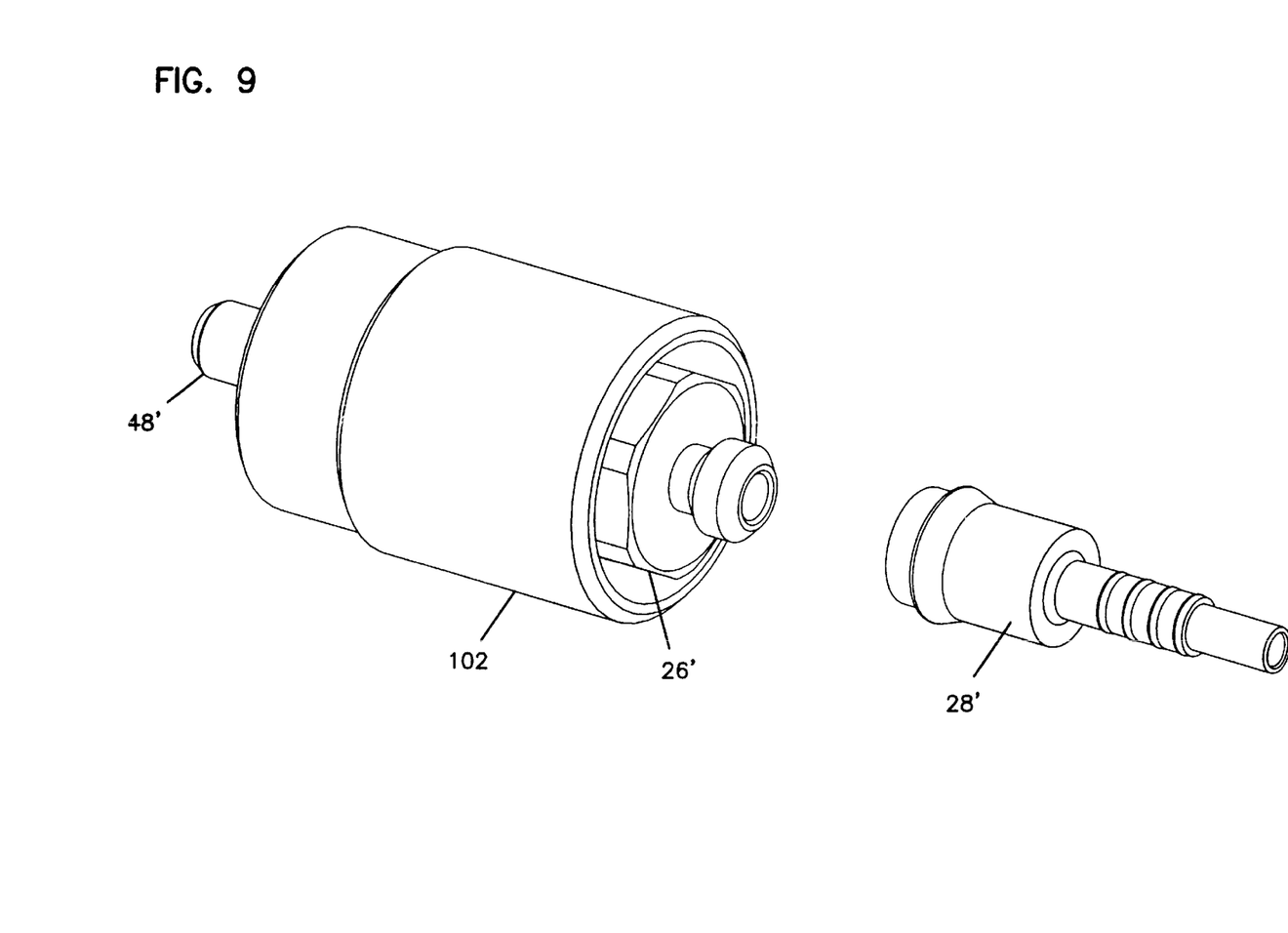
FIG. 9 illustrates the connector of FIG. 8 with a rear extension piece removed.
Figure 10:
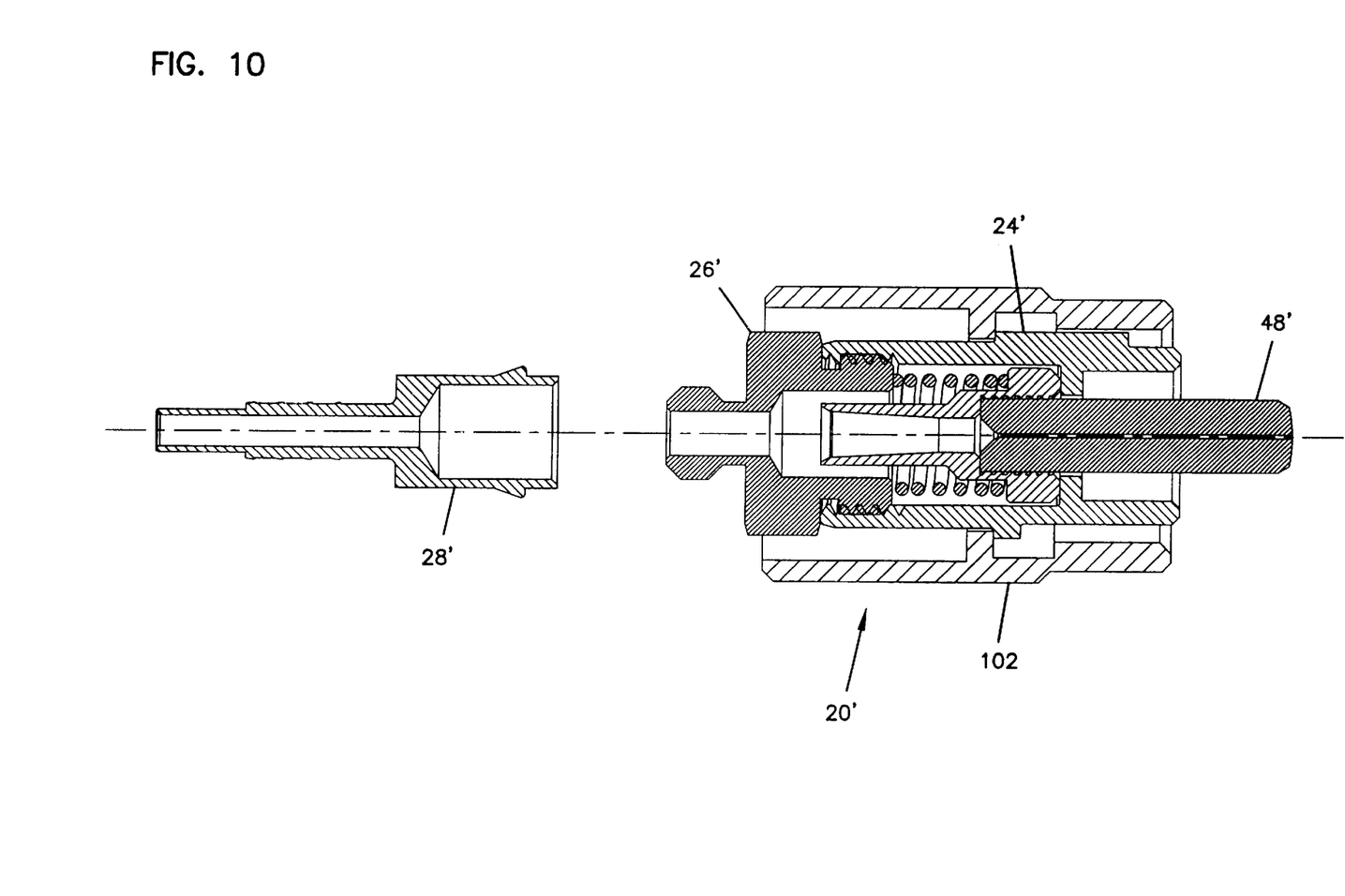
FIG. 10 is a cross-sectional view taken longitudinally through the connector of FIG. 8.

FIGS. 8–10 illustrate an FC-type connector 20' constructed in accordance with the principles of the present invention. The connector 20' includes a front housing piece 24' (shown in FIG. 10) and rear housing piece 26'. The rear housing piece 26' is threaded within the front housing piece 24'. A nut 102 for securing the connector 20' to an adapter is rotatably mounted about the front housing piece 24'. A spring biased ferrule 48' is slidably mounted within the front housing piece 24'. Similar to the embodiment of FIGS. 1–7, a rear extension piece 28' is non-unitarily connected to the rear housing piece 26'. In FIG. 9, the rear extension piece 28' has been removed from the remainder of the rear housing piece 26'.

It will be appreciated that the connector 20' can be assembled in a manner similar to the connector 20 described in FIGS. 1–7. It will also be appreciated that for the purpose of clarity, a fiber optic cable has not been shown positioned within the connector 20'.

With regard to the foregoing description, it is to be understood that changes may be made in detail, especially in matters of the construction materials employed and the shape, size and arrangement of the parts without the scope of the present invention. For example, while FC and SC-type connectors have been shown in this specification, it will be appreciated that the principles of the present invention are application to any number of other different types of connectors. It is intended that the specification and depicted aspects be considered exemplary only, with a true scope and spirit of the invention being indicated by the broad meaning of the following claims.

What is claimed is as follows:

1. A fiber optic device comprising:
   A) a fiber optic connector including:
      a) a first housing piece that extends along a longitudinal axis, the first housing piece including a front end positioned opposite from a rear end, and the first housing piece defining an inner chamber;
      b) a hub positioned within the inner chamber of the first housing piece, the hub including a passage that extends along the longitudinal axis, the hub being slidable along the longitudinal axis relative to the first housing piece;
      c) a ferrule connected to the hub that extends along the longitudinal axis from the hub toward the front end of the first housing piece, the ferrule defining a passage that extends in general axial alignment with the passage of the hub;
      d) a second housing piece positioned at the rear end of the first housing piece, the second housing piece defining a passage that is in general axial alignment with the passage of the hub;
      e) a spring captured between the hub and the second housing piece for biasing the hub toward the front end of the first housing piece;
      f) a third housing piece that is non-unitarily connected to the second housing piece, the third housing piece defining a passage that is in general axial alignment with the passage of the second housing piece, the third housing piece including an outer crimp region; and
   B) a fiber optic cable having a portion crimped against the outer crimp region of the third housing piece and a buffered portion that extends through the passage of the third housing piece, the fiber optic cable also including a fiber that extends through: 1) the passage of the ferrule; 2) the passage of the hub; 3) the passage of the second housing piece; and 4) the passage of the third housing piece.

2. The fiber optic device of claim 1, wherein the passages of the second and third housing pieces each have diameters, and the diameter of the third housing piece is smaller than the diameter of the second housing piece.

3. The fiber optic device of claim 2, wherein the diameter of the second housing piece passage is at least 25 percent larger than the diameter of the third housing piece passage.

4. The fiber optic device of claim 2, wherein a clearance less than 0.004 inches is provided between the buffered portion of the cable and a wall that defines the passage of the third housing piece.

5. The fiber optic device of claim 1, wherein the fiber optic cable has an outer jacket diameter less than 2 millimeters.

6. The fiber optic device of claim 1, wherein the front end of the first housing piece is adapted to interconnect with an adapter.

7. The fiber optic device of claim 1, wherein the crimping region includes a plurality of radial ribs.

8. The fiber optic device of claim 1, wherein the fiber optic fiber is secured to the ferrule by adhesive.

9. The fiber optic device of claim 1, wherein the buffered portion of the fiber optic cable extends through the passages of the hub, the second housing piece and the third housing piece.

10. The fiber optic device of claim 9, wherein a reinforcing portion of the fiber optic cable is crimped against the outer crimp region of the third housing piece.

11. The fiber optic device of claim 10, wherein the reinforcing portion comprises Kevlar.

12. The fiber optic device of claim 1, further comprising a strain relief hood connected to the third housing piece.

13. A method for assembling a fiber optic device, the method comprising:

providing a connector including a housing having a first end positioned opposite from a second end, the connector also including a ferrule that is spring biased toward the first end of the housing, the ferrule defining a longitudinal ferrule passage, the second end of the housing defining an access opening;

providing adhesive to the ferrule passage by inserting an adhesive delivering tool through the access opening;

connecting an extension piece to the second end of the housing after the adhesive has been provided to the passage of the ferrule, the extension piece defining an extension passage;

inserting a fiber of a fiber optic cable within the ferrule passage after the adhesive has been provided to the ferrule passage;

inserting a buffered portion of the fiber optic cable through the extension passage and the access opening;

positioning a casing and a strength portion of the fiber optic cable about an exterior of the extension piece; and securing at least the strength portion of the fiber optic cable to the exterior of the extension piece after the extension piece has been connected to the second end of the housing.

14. The method of claim 13, wherein the first end of the housing is defined by a first housing piece, and the second end of the housing is defined by a second housing piece that is connected to the first housing piece.

15. The method of claim 13, wherein the access opening has a larger diameter than the extension passage.

16. The method of claim 13, wherein the strength portion of the fiber optic cable is crimped against the exterior of the extension piece.

17. The method of claim 13, wherein the adhesive delivering tool comprises a needle.

18. A fiber optic connector for connectorizing a fiber optic cable comprising:

a) a first housing piece that extends along a longitudinal axis, the first housing piece including a front end positioned opposite from a rear end, and the first housing piece defining an inner chamber;

b) a hub sized to fit within the inner chamber of the first housing piece, the hub including a passage that extends along the longitudinal axis when the hub is mounted within the inner chamber;

c) a ferrule adapted to be connected to the hub, the ferrule defining a passage that extends in general axial alignment with the passage of the hub when the ferrule is connected to the hub;

d) a second housing piece adapted to be connected to the rear end of the first housing piece, the second housing piece defining a passage that is in general axial alignment with the longitudinal axis when the second housing piece is connected to the first housing piece;

e) a third housing piece arranged and configured to be non-unitarily connected to the second housing piece, the third housing piece defining a passage that is in general axial alignment with the passage of the second housing piece when the third housing piece is connected to the second housing piece, the third housing piece defining an outer crimp region including means for supporting a crimp that secures at least a portion of the fiber optic cable to the third housing piece; and f) the passages of the second and third housing pieces each having diameters, the diameter of the second housing piece passage being at least 25 percent larger than the diameter of the third housing piece passage.

19. A cable mounting structure for use with a fiber optic connector for connectorizing a fiber optic cable, the fiber optic connector including: a) a first housing piece that extends along a longitudinal axis, the first housing piece including a front end positioned opposite from a rear end, and the first housing piece defining an inner chamber; b) a hub sized to fit within the inner chamber of the first housing piece, the hub including a passage that extends along the longitudinal axis when the hub is mounted within the inner chamber; and c) a ferrule adapted to be connected to the hub, the ferrule defining a passage that extends in general axial alignment with the passage of the hub when the ferrule is connected to the hub, the cable mounting structure comprising:

i) a second housing piece adapted to be connected to the rear end of the first housing piece, the second housing piece defining a passage that is in general axial alignment with the longitudinal axis when the second housing piece is connected to the first housing piece; and ii) a third housing piece arranged and configured to be non-unitarily connected to the second housing piece, the third housing piece defining a passage that is in general axial alignment with the passage of the second housing piece when the third housing piece is connected to the second housing piece, the third housing piece defining an outer crimp region including means for supporting a crimp that secures at least a portion of the fiber optic cable to the third housing piece, the passages of the second and third housing pieces each having diameters, and the diameter of the passage of the second housing piece being at least 25 percent larger than the diameter of the passage of the third housing piece.

20. A fiber optic device comprising:

A) a connector housing that extends along a front-to-rear axis, the connector housing including:
a front housing piece;
an intermediate housing piece connected to the front housing piece, the intermediate housing piece defining a passage aligned along the front-to-rear axis;
a rear housing piece that is non-unitarily connected to the intermediate housing piece, the rear housing piece defining a passage that is in general alignment with the passage of the intermediate housing piece, the passages of the intermediate and rear housing pieces each having diameters, the diameter of the intermediate housing piece passage being larger than the diameter of the rear housing piece passage;

B) a hub positioned within the connector housing, the hub including a passage that generally aligns with the passage of the intermediate housing piece, the hub being movable relative to the connector housing along the front-to-rear axis, the hub being biased toward a front end of the connector housing;

C) a ferrule connected to the hub, the ferrule defining a passage that extends in general axial alignment with the passage of the hub; and D) a fiber optic cable including a fiber portion adhesively bonded within the passage of the ferrule, a buffered portion that extends through the passage of the rear housing piece, a reinforcing portion crimped to an exterior of the rear housing piece, and an outer casing crimped to the exterior of the rear housing piece.

21. The fiber optic device of claim 20, wherein the reinforcing portion includes Kevlar.

22. The fiber optic device of claim 20, wherein the diameter of the intermediate housing piece passage is at least 25 percent larger than the diameter of the rear housing piece passage.

23. The fiber optic device of claim 20, wherein the hub is captured between the front housing piece and the intermediate housing piece, and wherein the fiber optic device includes a spring captured between the intermediate housing piece and the hub.

* * * * *